No. 774,626. PATENTED NOV. 8, 1904.
R. L. WIDNEY.
FOWL WATERING FOUNTAIN.
APPLICATION FILED MAY 9, 1904.
NO MODEL.
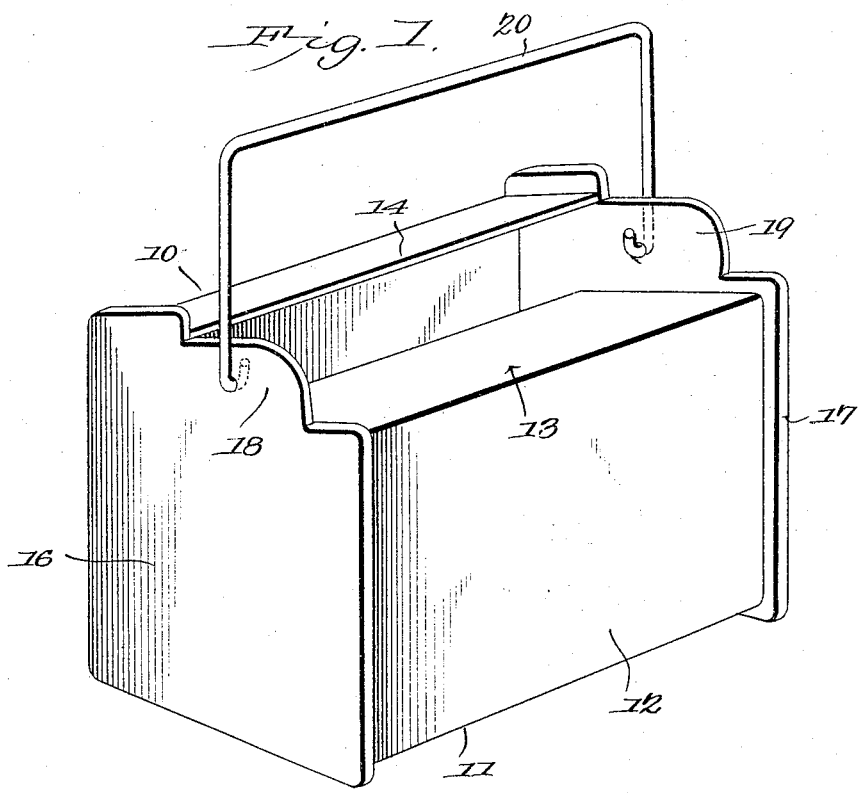
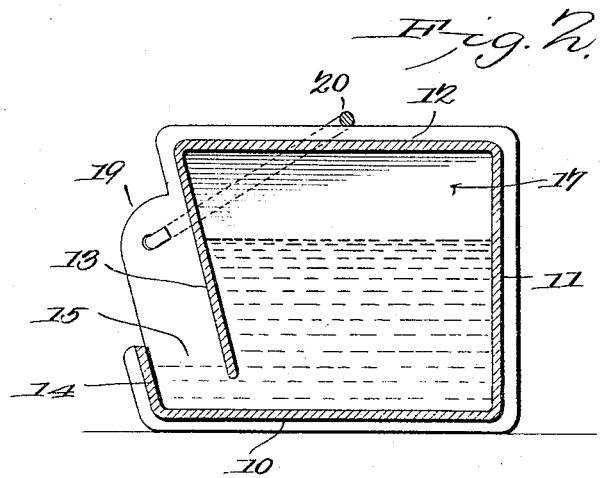
Witnesses
E. F. Stewart
C. N. Woodward
Ralph L. Widney, Inventor.
by C. A. Snow & Co.
Attorneys No. 774,626.

Patented November 8, 1904.

UNITED STATES PATENT OFFICE.

RALPH L. WIDNEY, OF LAHARPE, ILLINOIS.

FOWL-WATERING FOUNTAIN.

SPECIFICATION forming part of Letters Patent No. 774,626, dated November 8, 1904.

Application filed May 9, 1904. Serial No. 207,092. (No model.)

*To all whom it may concern:*

Be it known that I, RALPH L. WIDNEY, a citizen of the United States, residing at Laharpe, in the county of Hancock and State of Illinois, have invented a new and useful Fowl-Watering Fountain, of which the following is a specification.

This invention relates to poultry drinking-fountains, and has for its object to simplify and improve the construction and produce a device of this character which may be inexpensively constructed, will be efficient in action, and possessing increased strength and durability.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a perspective view of the device in position for tansportation. Fig. 2 is a transverse section with the device in operative position.

The improved device comprises a tank of any suitable material, but preferably of galvanized iron or steel, and with a closed bottom 10, rear 11, and top 12, with the front in two sections 13 14, the upper and longer section, 13, inclined inwardly and the lower and shorter section, 14, inclined outwardly and with the contiguous edges spaced apart and overlapping and forming the drinking-trough 15 of the device. By arranging the two sections or walls 13 and 14 on inclined lines more drinking-space is afforded, and the water may be more conveniently reached by the fowls. At the same time wall 13 will in a measure act as a guiding-spout for directing the water to the interior of the tank during the filling operation, and the inclined wall 14 will serve at this time as an overhanging guard to prevent splashing of the water. The end walls 16 and 17 of the tank are extended on all sides beyond the remaining walls of the tank, forming two projecting flanges which will protect the main walls in all positions of the tank. When in operative position, as shown in Fig. 2, the flanges will rest on the ground and the bottom of the tank will be held slightly elevated, so as to prevent dents or cuts if placed on a rough surface, and by holding the bottom of the tank elevated danger of corrosion will be reduced to a minimum. During the filling operation the flanges also serve as supports for the tank, and in any position which the latter may assume the flanges will always strike against the supporting-surface and prevent contact of the body portion of the tank therewith.

The flanges are extended, as indicated at 18 and 19, on lines approximately parallel with the sections or walls 13 and 14 and form side guards to prevent the water running from the surface of the wall 13 during the filling operation. They likewise serve as ears, through which may be passed the ends of a carrying-bail 20. When the bail is allowed to fall, it will strike against the projecting flanges and will thus be held free from the body of the tank, so that it may be conveniently grasped when the tank is to be transported.

The tank may be of any desired size or capacity and of any suitable proportions and will be a very useful and convenient device for the purposes described.

Having thus described the invention, what is claimed is—

A drinking-fountain comprising a tank having a bottom, top and rear walls and provided with a front wall made in two sections separated to form a drinking-space, the lower edge of the upper section extending below the upper edge of the lower section to form a water seal, both of the sections being inclined to permit convenient access to said drinking-space, and end walls that are extended on all sides to points beyond all of the remaining walls of the fountain and serve as guards and as rests on which the trough is supported, the end walls at the front of the fountain being extended to form side guards and ears, and a carrying-bail connected to the ears, substantially as specified.

In testimony that I claim the foregoing as my own I have hereto affixed my signature in the presence of two witnesses.

RALPH L. WIDNEY.

Witnesses:
CLAY NUDD,
JNO. W. WALKER.